United States Patent

Bloomer

[11] Patent Number: 6,089,148
[45] Date of Patent: Jul. 18, 2000

[54] FIXED STROKE POWER PRESS SAFETY STOP BLOCK

[76] Inventor: Thomas J Bloomer, 118 Torrington Rd., Goshen, Conn. 06756

[21] Appl. No.: 09/327,439

[22] Filed: Jun. 7, 1999

[51] Int. Cl.[7] .................................................... B30B 15/14
[52] U.S. Cl. ........................................... 100/341; 100/350
[58] Field of Search ............................. 100/53, 913, 341, 100/350; 72/441, 444; 83/2, 3, 526, 545

[56] References Cited

U.S. PATENT DOCUMENTS

| | | |
|---|---|---|
| 2,240,630 | 5/1941 | Stacy . |
| 2,653,560 | 9/1953 | Bradhering . |
| 2,946,277 | 7/1960 | Archer . |
| 2,990,578 | 7/1961 | Adair et al. . |
| 3,023,457 | 3/1962 | Sunday . |
| 3,095,804 | 7/1963 | Lindner . |
| 3,333,447 | 8/1967 | Alspaugh . |
| 3,541,950 | 11/1970 | Anderson . |
| 3,650,650 | 3/1972 | Cook, Jr. . |
| 3,731,573 | 5/1973 | Jahnke et al. . |
| 3,855,920 | 12/1974 | Wright . |
| 3,855,921 | 12/1974 | Wright . |
| 4,026,204 | 5/1977 | Good . |
| 4,059,320 | 11/1977 | Piaget ........................................ 100/53 |
| 4,161,140 | 7/1979 | Altman . |
| 4,822,266 | 4/1989 | Amanno . |
| 4,850,255 | 7/1989 | Pruvot et al. . |

*Primary Examiner*—Peter Vo
*Assistant Examiner*—Louis K. Huynh
*Attorney, Agent, or Firm*—Mark E. Pochal

[57] ABSTRACT

A fixed stroke power press safety stop block, manufactured of a light weight metal or plastic sufficient to withstand the dead weight of a ram and an attached upper die shoe preventing inadvertent downward movement of said ram. The stop block manufactured to be disposed on top of an existing die stop of a lower die shoe of said press and extending upwardly beneath the upper die shoe in the relative space between said die stop and said upper die platen when ram is in a upper most open position. Said block having a height equivalent to the fixed stroke of said ram less no greater than 0.250 of an inch permitting use of stop block in all die sets used relative to said press notwithstanding variances in shut heights. It is understood said shut height is determined by adjustment of ram crankshaft configuration causing contact by said upper die shoe with lower die stop at the lower most position of said ram. The inventive device is to be used in combination with a removable interlocking plug fixedly attached to said stop block used in conjunction with a circuitry on said press responsible for activation of said ram. Said plug being in a displaced position disrupting completion of said circuitry when block is disposed beneath said upper die platen.

6 Claims, 2 Drawing Sheets

FIXED STROKE POWER PRESS SAFETY STOP BLOCK

BACKGROUND OF THE INVENTION

The present invention pertains to a safety stop block designed for use on a fixed stroke power press preventing inadvertent downward movement of the ram of the press while performing maintenance or die tool replacement.

The use of safety blocks on power presses is well known in the prior art and their use is mandated by state and federal laws. Given the tremendous forces generated by these presses, inadvertent downward movement of their rams while maintenance or die tool replacement is being performed can cause severe damage to an operator's hand or limbs as well as to the press.

Known prior art safety blocks include U.S. Pat. No. 3,855,921 and U.S. Pat No. 3,855,920. These patents attempted to solve the problem of needing numerous safety blocks of varying heights to accommodate varying shut heights presented by different die sets used on the respective press. The above referenced patents disclose an adjustable stop block. Operation of these stop blocks is time consuming having to adjust the height with each different shut height. Also, a large shut height necessitating using a large sized safety block is cumbersome to operate. The standard lengths of these safety blocks generally vary between 12 to 24 inches.

Also known in the prior art is the jack-type adjustable safety block shown in U.S. Pat. No. 2,653,560. Again, it is time consuming to adjust the safety block with each different shut height. Another limitation of these safety blocks is that they are positioned on the bolster plate or press bed and beneath the upper die shoe. A problem arises when the die tool encompasses the entire die ram area leaving no space to position the safety block. As a result of these limitations use of safety stop blocks are neglected as profitability is the main concern. Present commercial safety stop blocks, available from Rockford Systems, Inc. include an aluminum safety block with wedge attachments for adjustments in shut heights and an adjustable screw device block, have not resolved all the above defined limitations.

BRIEF SUMMARY OF THE INVENTION

Accordingly, it is an object of the present invention to provide a safety stop block that is light weight in material and commercially feasible as well as time- efficient in its use for press operators. Since the safety stop block of the present invention mounts on top of an existing die stop, the size of these safety blocks is substantially less making them more user friendly.

It is another object of the present invention to provide a universal safety block that may be used with any die set that may be used on a respective fixed stroke power press without necessitating adjustment of the safety stop block due to variances in shut heights. A further object is to provide a stop block to be used with large die tools that encumber the entire die ram area without the space limitation problem encountered with present safety blocks by mounting the stop block of the present invention on top of the existing die stop.

Accordingly, the present invention entails a safety stop block whose size dimensions are essentially equal to the stroke distance of the power press. Since use of this invention is in combination with fixed stroke power presses, the stroke distance of the ram will be constant. Therefore, no matter what die set is required for any work order utilizing a respective power press, the safety stop block of the present invention is adaptable without necessitating any adjustments. The safety stop block of this present invention is easily and quickly mounted on top of the existing die stop with the press ram in an upper most position or top of the stroke and secured by a fastening means. The body of the stop block extends in an upward direction to beneath the upper die shoe thereby preventing inadvertent downward movement of the press ram. It is understood that adjustments of the ram for different die sets are made so that at the bottom of the ram stroke the upper die shoe will come in contact with the die stop.

In combination with the present invention is a power interlock plug coupled with the safety block to prevent passage of a power source to the press circuitry activating the ram when the safety block is in use.

DETAILED DESCRIPTION OF THE INVENTION

Figure 1:
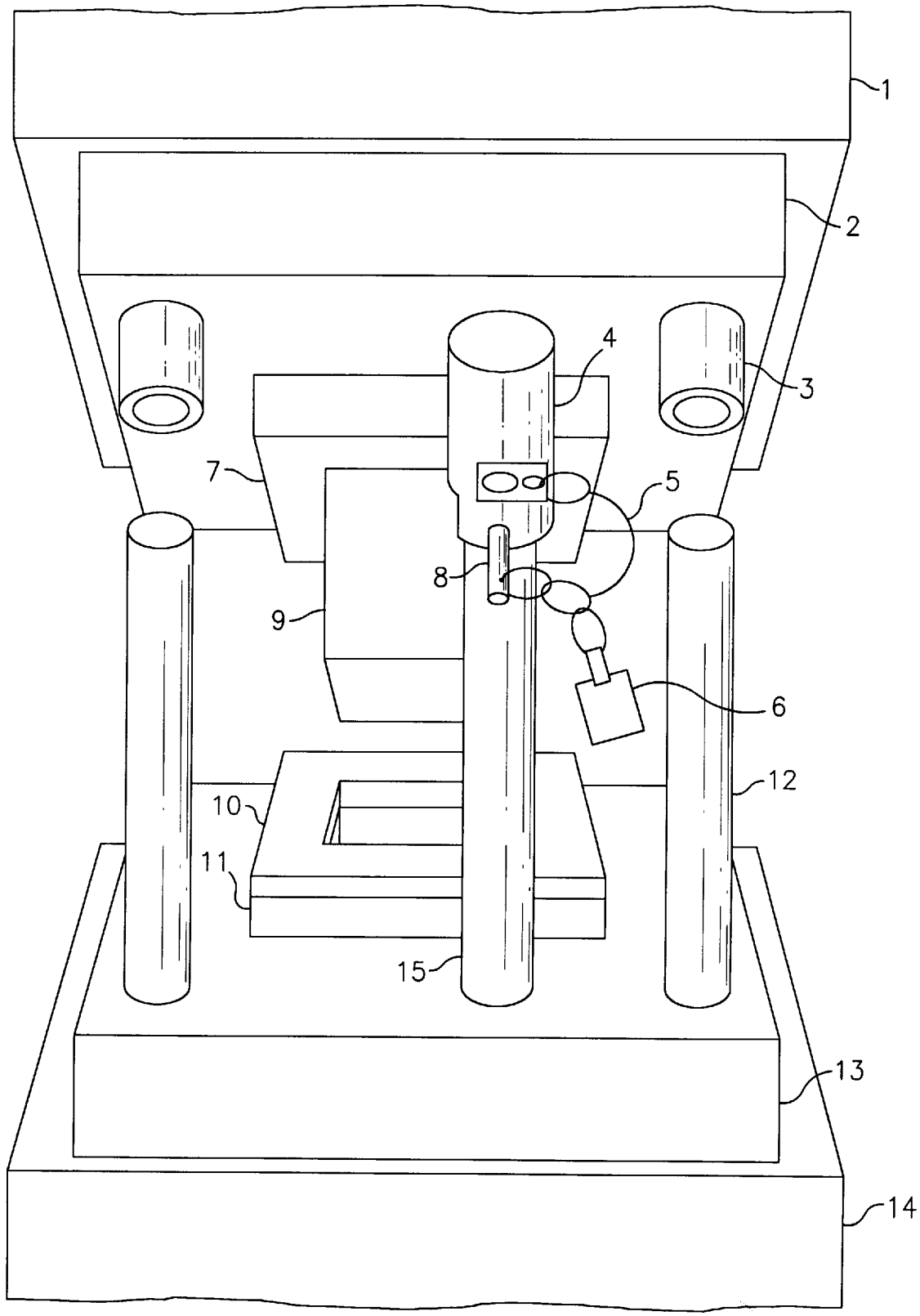
FIG. 1 is a diagrammatic view of a die set mounted to the ram and press bed and includes a preferred embodiment of the safety block of the present invention.

An exemplary embodiment of the invention described herein and illustrated in FIG. 1 comprising a fixed stroke power press safety block intended for use in combination with power presses having a standard crankshaft configuration and a fixed stroke. The press comprising a moveable ram 1 reciprocated in a vertical direction by a power means, not shown. Attached beneath the ram 1 is the upper die shoe 2 securing punch holder 7, punch 9 and upper guide bushings 3. Secured to the press bed 14 is the fixed lower die shoe 13, supporting a die stop 15, lower guide post 12, die 11 and stripper 10.

In operation of said press, ram 1 and upper die shoe 2 move in a downward direction in alignment with said lower die shoe 13 by communication of upper guide bushings 3 passing over said lower guide posts 12. Said ram 1 travelling a predetermined distance for desired spacing between die 11 and punch 9 at the end of the downward stroke. Said predetermined distance is known by those skilled in the art as the shut height. Said shut height being determined by the point of contact of said upper die shoe 2 with die stop 15. Said shut heights varying with different die 11 heights requiring adjustment of said ram 1 by means of the crankshaft configuration of said presses, not shown.

Referring to FIG. 1, the fixed stroke power press safety stop block in operational view comprises a block 4 removeably mounted on top of said die stop 15 at the base of said block 4 and having a body extending upwardly between die stop 15 and beneath upper die shoe 2 preventing downward movement of ram 1 and upper die shoe 2. The height of said body of block 4 being substantially equivalent, less no more than 0.250 inch, to the stroke of said press. Said stroke defined as the distance the ram will travel from a upper most position to a lower most position. The safety stop block is intended for use with fixed stroke presses, said stroke distance being constant permitting use of said safety block notwithstanding varying shut heights presented with different die sets used on a respective press.

Figure 2:
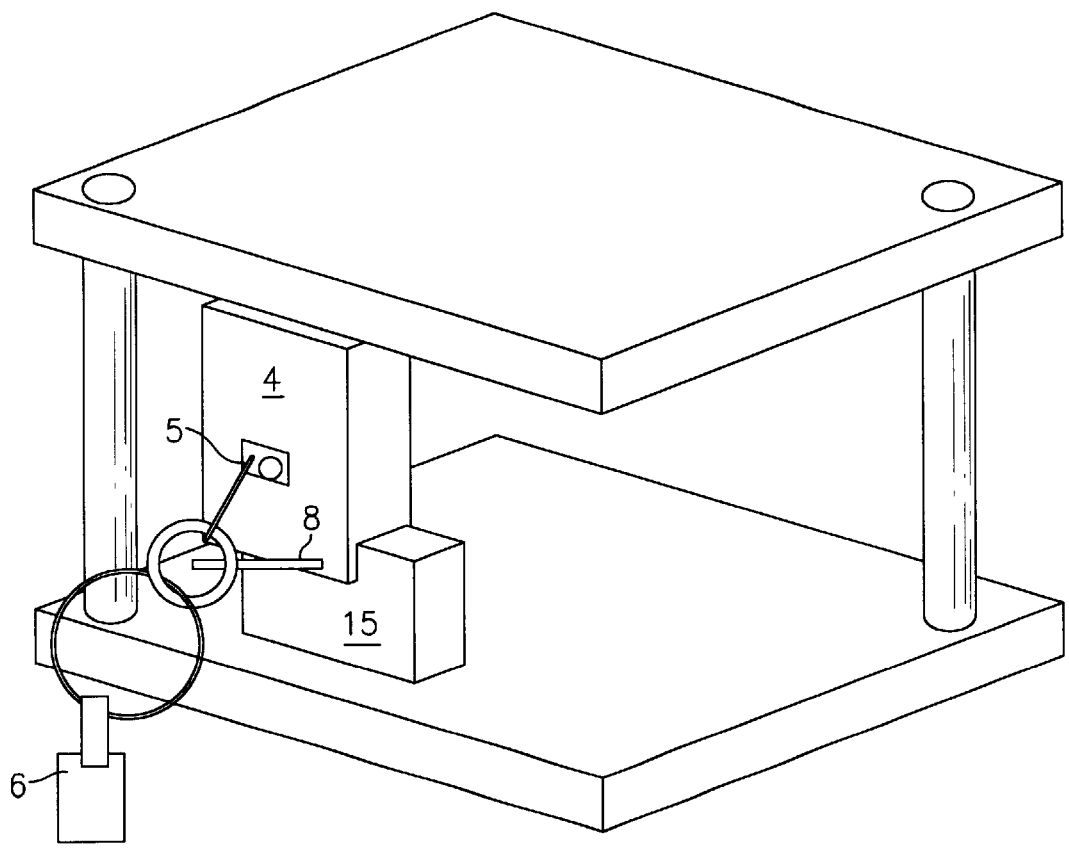
FIG. 2 is a diagrammatic view of a second embodiment of the stop block of the present invention adapted to receive a die stop that is rectangle in shape.

In a second embodiment depicted in FIG. 2, the safety block 4 is adapted for use in fixed stroke power presses with a non-circular existing die stop 15.

Figure 3:
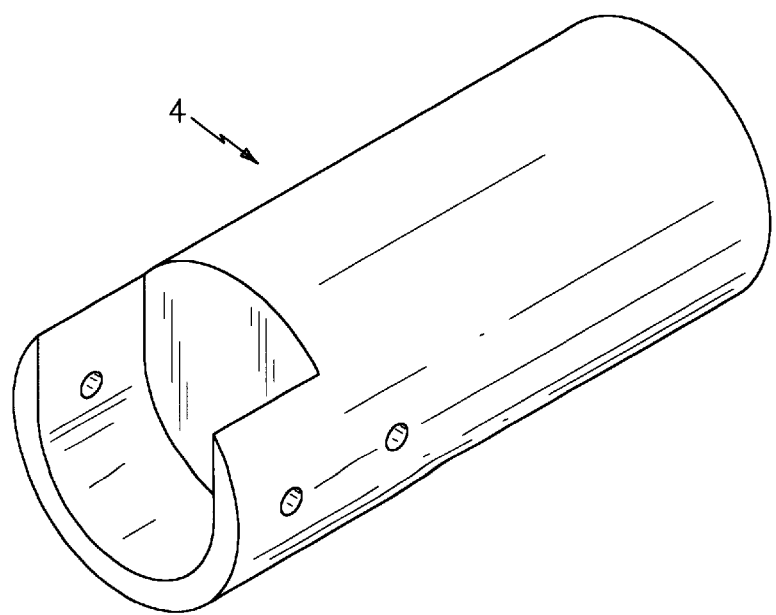
FIG. 3 is an isolated view of a preferred embodiment of the stop block of the present invention.

The safety block 4 depicted in FIG. 3 comprises a solid block having a core in the base contiguous with a notch for quick insertion over die stop 15. Said base mounted on top of die stop 15 having a first and second aperture distally apart through said base in alignment with a third aperture in die stop 15 for receiving pin 8 to temporarily secure said base to said die stop 15. It is understood that said third aperture in die stop 15 must be pre-drilled for operation of the present invention.

Further depicted in a preferred embodiment in FIGS. 1 & 2 is an interlocking plug 6 fixedly coupled to block 4 by lanyard 5. Said interlocking plug 6 disposed into a circuitry mechanism providing a power means to activate ram 1. When said block is mounted on top die stop 15 beneath upper die shoe 2, the interlocking plug being in a disconnected position relative to said circuitry mechanism preventing a power means from activating ram 1.

It is to be understood that the invention is not limited to the above described embodiment or embodiments. Various modifications, some of which will be apparent to those skilled in the art, may be made without departing from the true spirit of the invention which is intended to be covered by the Letters Patent hereby applied for.

What is claimed as being new and desired to be protected by letters patent of the united states is as follows:

1. In a fixed stroke power press having the combination of, an upper vertically reciprocating die shoe activated by a ram having a crankshaft configuration, a die stop attached to a lower die shoe positioned relatively apart from the upper vertically reciprocating die shoe providing a space, and a ram activating means, wherein the improvement comprises combining a safety stop block supported on the die stop for preventing downward movement of the upper vertically reciprocating die shoe while the fixed stroke power press is in an inoperative state, said safety stop block comprising:

a. a top with a planar surface;

b. a solid elongated body dimensioned as to be vertically insertable through the space defined between the lower die shoe and upper vertically reciprocating die shoe when positioned relatively farthest apart;

c. a base having a bottom core sized to fit over the die stop and a notch contiguous with said bottom core for access and removal of said base; and d. a fastening means for attaching said base to the die stop.

2. The safety stop block as defined in claim 1, wherein said fastening means comprising:

a. a fastener;

b. a pair of holes on said notch of said base providing a fluid communication with an aperture in the die stop for receiving said fastener.

3. The safety stop block as defined in claim 2, wherein said fastener is a quick release pin.

4. The safety stop block as defined in claim 1, wherein said elongated body is composed of a lightweight material capable of supporting a compressive load requirement of the upper reciprocating die shoe.

5. The safety stop block as defined in claim 4, wherein said lightweight material is metal.

6. The safety stop block as defined in claim 4, wherein said lightweight material is plastic.

* * * * *